US010808111B2

(12) United States Patent
Dias et al.

(10) Patent No.: US 10,808,111 B2
(45) Date of Patent: Oct. 20, 2020

(54) POLYPROPYLENE IMPACT COPOLYMERS WITH LOW HAZE

(71) Applicant: Braskem America, Inc., Philadelphia, PA (US)

(72) Inventors: Peter Simon Dias, Malvern, PA (US); Craig Charles Meverden, Wexford, PA (US); Edward E. Catalina, Greensburg, PA (US); Thomas Cuthbert, Houston, TX (US); Rita Majewski, Pittsburgh, PA (US); Debra R. Wilson, Houston, TX (US)

(73) Assignee: Braskem America, Inc., Philadelphia, PA (US)

( * ) Notice: Subject to any disclaimer, the term of this patent is extended or adjusted under 35 U.S.C. 154(b) by 616 days.

(21) Appl. No.: 14/773,976

(22) PCT Filed: Mar. 13, 2014

(86) PCT No.: PCT/US2014/026292
§ 371 (c)(1),
(2) Date: Sep. 9, 2015

(87) PCT Pub. No.: WO2014/160311
PCT Pub. Date: Oct. 2, 2014

(65) Prior Publication Data
US 2016/0040000 A1 Feb. 11, 2016

Related U.S. Application Data

(60) Provisional application No. 61/783,894, filed on Mar. 14, 2013.

(51) Int. Cl.
*C08F 210/06* (2006.01)
*C08L 23/12* (2006.01)
(Continued)

(52) U.S. Cl.
CPC .............. *C08L 23/14* (2013.01); *B29C 48/21* (2019.02); *B32B 1/02* (2013.01); *B32B 27/08* (2013.01);
(Continued)

(58) Field of Classification Search
CPC ........ C08L 23/12; C08L 23/14; C08L 23/142; C08L 2323/12; C08L 2323/14;
(Continued)

(56) References Cited

U.S. PATENT DOCUMENTS 6,015,854 A    1/2000  McCullough, Jr.
6,197,886 B1 * 3/2001  Chatterjee ............... C08L 23/12
                                                    525/240
(Continued)

FOREIGN PATENT DOCUMENTS

WO   WO 2012/085612 A1   6/2012
WO   WO 2013/004804 A1   1/2013

OTHER PUBLICATIONS

Extended European Search Report, Application No. 14775618.3, dated Jun. 23, 2016.

*Primary Examiner* — Lee E Sanderson
(74) *Attorney, Agent, or Firm* — Duane Morris LLP

(57) ABSTRACT

The present invention provides an in-reactor solution that avoids costly blending and the use of metallocene elastomers. The inventive Ziegler-Natta polypropylene composition also includes additional components that may improve properties relative to a metallocene catalyzed elastomers. The invention is a clear impact polypropylene composition that is made in-reactor with Ziegler-Natta catalyst, and is suitable for a wide range of processes. Unlike other clear impact copolymers, it does not rely on high-shear processes (Continued)

or compounding with elastomers. The invention uses conventional polypropylene reactor technology to produce these compositions.

12 Claims, 6 Drawing Sheets

(51) Int. Cl.
*C08L 23/14* (2006.01)
*B29C 48/21* (2019.01)
*B32B 27/30* (2006.01)
*B32B 27/08* (2006.01)
*B32B 1/02* (2006.01)
*B32B 27/32* (2006.01)
*C08J 5/00* (2006.01)
*C08J 5/18* (2006.01)
*B29K 105/00* (2006.01)
*B29C 49/02* (2006.01)
*B29C 49/22* (2006.01)
*B29K 23/00* (2006.01)

(52) U.S. Cl.
CPC .............. *B32B 27/30* (2013.01); *B32B 27/32* (2013.01); *C08F 210/06* (2013.01); *C08J 5/00* (2013.01); *C08J 5/18* (2013.01); *C08L 23/12* (2013.01); *C08L 23/142* (2013.01); *B29C 49/02* (2013.01); *B29C 49/22* (2013.01); *B29C 2049/028* (2013.01); *B29K 2023/12* (2013.01); *B29K 2105/258* (2013.01); *B29K 2995/0026* (2013.01); *B32B 2250/03* (2013.01); *B32B 2250/242* (2013.01); *B32B 2270/00* (2013.01); *B32B 2307/412* (2013.01); *B32B 2307/558* (2013.01); *B32B 2439/02* (2013.01); *C08J 2323/12* (2013.01); *C08J 2323/14* (2013.01); *C08J 2423/08* (2013.01); *C08L 2203/10* (2013.01); *C08L 2205/025* (2013.01); *C08L 2207/02* (2013.01)

(58) Field of Classification Search
CPC .. C08L 2207/02; C08L 23/16; C08L 2308/00; C08F 210/06; C08F 210/16; C08F 297/083
USPC ........................................................ 525/240
See application file for complete search history.

(56) References Cited

U.S. PATENT DOCUMENTS

| | | | |
|---|---|---|---|
| 7,381,773 | B2 | 6/2008 | Pelliconi et al. |
| 7,732,530 | B2 | 6/2010 | Fuchs et al. |
| 8,044,135 | B2 | 10/2011 | Doufas et al. |
| 8,076,429 | B2 | 12/2011 | Pezzutti et al. |
| 8,247,512 | B2 | 8/2012 | Hodges et al. |
| 2004/0159972 | A1* | 8/2004 | Koschmieder ........... C08K 5/14 264/211.24 |
| 2006/0173132 | A1* | 8/2006 | Mehta ..................... C08L 23/10 525/191 |
| 2009/0105417 | A1 | 4/2009 | Walton et al. |
| 2011/0124817 | A1 | 5/2011 | Dias et al. |
| 2012/0302701 | A1* | 11/2012 | Martin .................... C08F 10/06 525/191 |

* cited by examiner

POLYPROPYLENE IMPACT COPOLYMERS WITH LOW HAZE

CROSS REFERENCE TO RELATED APPLICATION

This application claims priority to U.S. provisional application Ser. No. 61/783,894 which was filed in the United States Patent and Trademark Office on Mar. 14, 2013.

BACKGROUND OF THE INVENTION

Polypropylene compositions have gained wide commercial acceptance and usage in numerous applications because of the relatively low cost of the polymers and the desirable properties they exhibit. In general, polypropylene polymers, particularly propylene homopolymers, have a disadvantage of being brittle with low impact resistance, especially at low temperatures. To combat these issues, manufacturers have incorporated rubber, which forms a dispersed phase within the polypropylene matrix. These two-phase materials are referred to as impact copolymers or ICPs.

While impact resistance is improved, a major drawback to such materials is their poor transparency, mostly due to the rubber particles being large enough to affect light transmission in the heterophasic system. Accordingly, several attempts have been made to improve the transparency of heterophasic polymer systems.

Some ICPs have been able to achieve clarity by refractive index matching the dispersed phase to the matrix material. Other ICPs have sought to achieve clarity by increasing dispersed phase miscibility to achieve particles which are not large enough to affect the light transmission. While these approaches may produce clear materials, they generally lack the stiffness and/or toughness of a conventional ICP.

ICPs can be formed by blending a rubber with a matrix phase, but it is more preferred, from a cost-to-produce standpoint, that they are prepared using an in-reactor process, where the matrix and the dispersed phase are formed in separate reactors, typically operated in series. Thus, it would be desirable to have an in-reactor ICP which is clear, stiff, tough and which is not based on refractive index matching or using rubber with increased miscibility with the matrix.

McCullough in U.S. Pat. No. 6,015,854, herein incorporated by reference, describes impact copolymers containing 0.1-10 wt. % ethylene and a dispersed phase containing 30-90 wt. % ethylene. However, the dispersed copolymer phase particles are believed to scatter light by virtue of physical properties such as size, density and inhomogenous composition, resulting in an observed haze. Random copolymers, i.e., single phase polypropylene with a comonomer, have been used for applications that require clarity. These random copolymers, however, do not have the necessary physical properties for applications where impact copolymers are normally used, in this case, impact resistance at cold temperatures (e.g., about 4° C.).

In order to overcome the limitation of low impact toughness, metallocene copolymers (elastomers and plastomers) and styrenic block copolymers are sometimes blended into polypropylene. These additives work by either (a) having refractive indices that match that of polypropylene (approximately 1.50) or (b) particle sizes that are small enough not to refract light and therefore cause haze.

Incorporation of such additive components into polypropylene is not desirable, for a number of reasons. For example, it requires an additional compounding step which adds cost and complexity in both production and logistics. Additionally, the metallocene elastomers and styrenic block copolymers are often costly to produce relative to conventional Ziegler-Natta polypropylene (ZN-PP).

Moreover, it is known that multiphase propylene copolymers having a good impact toughness and a decreasing stiffness can be prepared by means of Ziegler-Natta catalyst systems in a multistage polymerization reaction. However, known compositions that incorporate ethylene-propylene copolymers having a high proportion of ethylene into a polymer matrix make the multiphase propylene copolymer turbid. Poor miscibility of the dispersed phase with the polymer matrix leads to a separation of the phases and thus to turbidity and to poor transparency values of the heterogeneous copolymer. Ethylene-propylene copolymers prepared by means of conventional Ziegler-Natta catalysts also have a very inhomogeneous composition.

SUMMARY OF THE INVENTION

The present invention provides an in-reactor solution that avoids costly blending and the use of metallocene elastomers. The inventive Ziegler-Natta polypropylene composition ("ZN-PP") also includes additional components that may improve properties relative to metallocene catalyzed elastomers.

The present invention is a clear impact polypropylene composition that is made in-reactor with ZN catalyst, and is suitable for a wide range of processes. Unlike other clear impact copolymers, it does not rely on high-shear processes or compounding with elastomers. The invention uses conventional polypropylene reactor technology to produce these compositions.

The present invention relates to a propylene impact copolymer comprising a matrix comprising a polypropylene homopolymer or a propylene/alpha-olefin random copolymer which comprises more than 50 wt. % of units derived from propylene monomer; and a dispersed phase comprising less than 50 wt. % of an ethylene-propylene copolymer, wherein the dispersed phase has a melting point between 100° C. and 130° C., and an enthalpy greater than 11 J/g. The melting point may vary in two degree increments up to 130° C., i.e., 102° C., 104° C., etc. In addition, the enthalpy may vary in 1 J/g increments up to 30 J/g, i.e., 12 J/g, 13 J/g, etc. Further embodiments may have low xylene solubles less than 10 wt. %, decreasing in 1 wt. % increments down to 1 wt. %.

The propylene impact copolymer can have a haze value less than 30% in a 50 mil plaque.

The propylene impact copolymer can have a haze value less than 15% in a 20 mil plaque.

The propylene impact copolymer dispersed phase can have a molar gas ratio greater than 0.82 in-reactor.

The propylene impact copolymer can have a Gardner impact value greater than 200 in-lbs.

The propylene impact copolymer is catalyzed with Ziegler-Natta catalyst.

The propylene impact copolymer may be made using one or more matrix phase polymerization steps, occurring in one or more gas phase reactors; one or more dispersed phase polymerization steps, occurring in one or more liquid phase reactors; and at least one de-gassing step.

The present invention further relates to a manufactured article comprising (a) a matrix comprising a polypropylene homopolymer or a propylene/alpha-olefin random copolymer which comprises more than 50 wt. % of units derived from propylene monomer; and (b) a dispersed phase comprising an ethylene-propylene copolymer, wherein the dispersed phase has a melting point between 100° C. and 130° C., and an enthalpy greater than 11 J/g. The melting point may vary in two degree increments up to 130° C., i.e., 102° C., 104° C., etc. In addition, the enthalpy may vary in 1 J/g increments up to 30 J/g, i.e., 12 J/g, 13 J/g, etc. Further embodiments may have low xylene solubles less than 10 wt. %, decreasing in 1 wt. % increments down to 1 wt. %.

The manufactured articles herein may take many forms, such as a thermoformed articles, blow molded articles, and injection molded articles.

DESCRIPTION OF THE PREFERRED EMBODIMENTS

Figure 1:
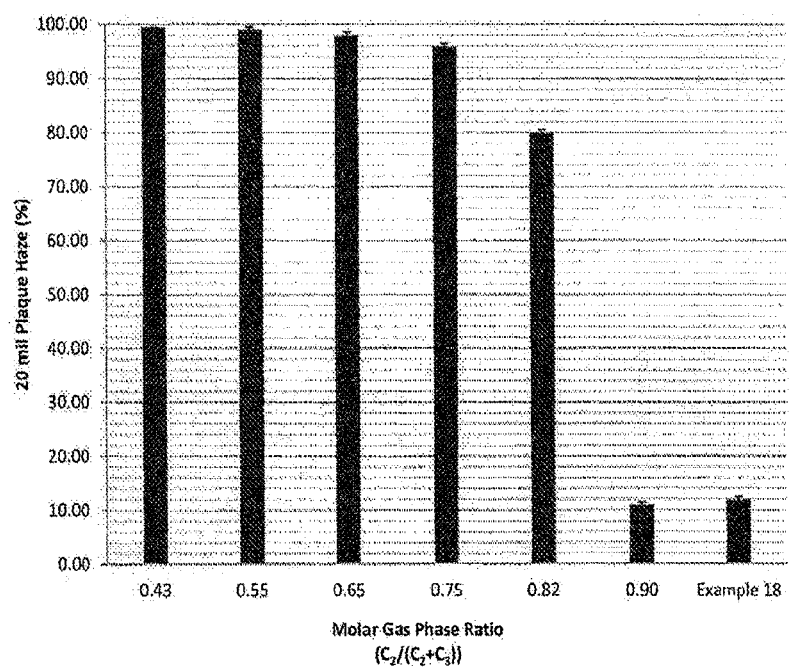
FIG. 1 depicts haze values as a function of the molar gas phase ratio.

For purposes of the description hereinafter, it is to be understood that the embodiments described herein may assume alternative variations and embodiments. It is also to be understood that the specific articles, compositions, and/or processes described herein are exemplary and should not be considered as limiting.

As used herein, haze generally refers to an appearance cause by scattered light upon passing through a film or sheet of a material that can produce a smoky or translucent field. The haze of the present invention is measured using ASTM D1003-97, wherein haze plaques were molded at two thicknesses: 50 and 20 mil.

As used herein, clarity generally refers to the amount of luminous transmittance described according to and measured per ASTM D1003 on a 20 mil plaque.

As used herein, flexural modulus (expressed in units of PSI) is the one percent secant modulus, which is further described according to and measured per ASTM D790 at 230° C.

As used herein, the melt flow rate (MFR; units of g/10 min or dg/min) is described according to and measured per ASTM D1238 using a load of 2.16 kg at 230° C.

As used herein, notched Izod impact strength (expressed in ft-lbs/in) was measured at 23° C. as described according to and measured per ASTM D256.

As used herein, Gardner Impact was measured at 0, 4, and 23° C. according to ASTM D5420-10 in the GC configuration. It is expressed in in-lbs.

As used herein, molar phase gas ratio (or molar gas ratio) refers to the quantity of ethylene in a dispersed phase polymerization step and, thus, the dispersed phase. It is defined by the equation:

Molar Gas Ratio=mol $C2$/(mol $C2$+mol $C3$)

where C2 is ethylene, and C3 is propylene.

As used herein, differential scanning calorimetry (or "DSC") describes a thermoanalytical technique in which the difference in the amount of heat required to increase the temperature of a sample and reference is measured as a function of temperature. About 5 to 10 mg of a sheet of the polymer pressed at approximately 200° C. is removed with a punch die and placed in a light aluminum pan (about 50 mg) and crimped shut. The thermal behavior was investigated using the following profile: The samples were heated to 200° C. and held isothermal for 3 minutes in order to remove any previous thermal history. The cooling and second heating curves were recorded in the temperature range of −20° C. to 200° C. using a scan rate of 10° C./min.

Catalysts employed in the polymerization of α-olefins may be characterized as supported catalysts or unsupported catalysts, sometimes referred to as homogeneous catalysts. The so-called conventional Ziegler-Natta catalysts are stereospecific complexes formed from a transition metal halide and a metal alkyl or hydride, such as titanium tetrachloride supported on an active magnesium dichloride. A supported catalyst component includes, but is not necessarily limited to, titanium tetrachloride supported on an "active" anhydrous magnesium dihalide, such as magnesium dichloride or magnesium dibromide. A supported catalyst component may be employed in conjunction with a co-catalyst such as an alkylaluminum compound, for example, triethylaluminum (TEAL). The Ziegler-Natta catalysts may also incorporate an electron donor compound that may take the form of various amines, phosphenes, esters, aldehydes, and alcohols.

Single site catalyzed polyolefins can differ from Ziegler-Natta catalyzed polyolefins in terms of molecular structure, particularly molecular weight and co-monomer distribution. The single site catalysts, such as metallocene catalysts, can create polyolefins with a narrow molecular weight distribution.

Metallocene catalysts are coordination compounds or cyclopentadienyl groups coordinated with transition metals through i-bonding. Metallocene catalysts are often employed as unsupported or homogeneous catalysts, although they also may be employed in supported catalyst components. With respect to the metallocene random copolymers, this term denotes polymers obtained by copolymerizing ethylene and an α-olefin, such as propylene, butene, hexene or octene, in the presence of a monosite catalyst generally consisting of an atom of a metal which may, for example, be zirconium or titanium, and of two cyclic alkyl molecules bonded to the metal. More specifically, the metallocene catalysts are usually composed of two cyclopentadiene-type rings bonded to the metal.

The impact modifying components in this composition were made using a heterogeneous Ziegler-Natta catalyst. Therefore, it is expected that several compositions exist in the impact modifying component.

It was unexpected that ZN-catalyzed PP would produce a dispersed phase component that avoids significant haze in the final composition. The present invention prefers high ethylene content to achieve a product having both high impact resistance and low haze. Examples with comparisons are found in the attached Tables 1-4 and FIGS. 1-6.

TABLE 1

| Example | Type | Process | Catalyst | External Donor | C2/(C2 + C3) molar | MFR | wt. % C2 (Tot-IR) | Haze (20 mil) | Haze (50 mil) |
|---|---|---|---|---|---|---|---|---|---|
| 1 | Comparative | Lab Pilot Plant | ZN-118 | P | 0.82 | 8.8 | 20.8 | 99 | n/a |
| 2 | Comparative | Lab Pilot Plant | ZN-118 | D | 0.43 | 11.3 | 7.5 | 99 | n/a |
| 3 | Comparative | Lab Pilot Plant | ZN-118 | D | 0.55 | 8.9 | 13.1 | 99 | n/a |
| 4 | Comparative | Lab Pilot Plant | ZN-118 | D | 0.65 | 4.9 | 16.3 | 99 | n/a |

TABLE 1-continued

| Example | Type | Process | Catalyst | External Donor | C2/(C2 + C3) molar | MFR | wt. % C2 (Tot-IR) | Haze (20 mil) | Haze (50 mil) |
|---|---|---|---|---|---|---|---|---|---|
| 5 | Comparative | Lab Pilot Plant | ZN-118 | D | 0.75 | 2.7 | 22.2 | 99 | n/a |
| 6 | Comparative | Lab Pilot Plant | ZN-118 | D | 0.82 | 2.7 | 23.5 | 99 | n/a |
| 7 | Comparative | Lab Pilot Plant | ZN-118 | D | 0.85 | 3.8 | 17.1 | 80 | n/a |
| 8 | Inventive | Lab Pilot Plant | ZN-118 | D | 0.88 | 2.8 | 22.2 | <20 | n/a |
| 9 | Inventive | Lab Pilot Plant | ZN-118 | D | 0.90 | n/m | 9.3 | 11 | n/a |
| 10 | Inventive | Lab Pilot Plant | ZN-118 | D | 0.90 | 3.1 | 20.4 | 14 | n/a |
| 13 | Inventive | Lab Pilot Plant | ZN-118 | D | 0.92 | 3.0 | 20.5 | 10 | n/a |
| 14 | Inventive | Lab Pilot Plant | ZN-118 | D | 0.95 | 0.5 | 29.2 | 20 | n/a |

TABLE 2

| Sample | Molar Gas Ratio $C_2/(C_2 + C_3)$ | ASTM D1003 Haze, 20 mil plaque (%) | ASTM D1003 Clarity, 20 mil plaque (%) | First DSC Melting Point (° C.) | Second DSC Melting Point | DMTA PP β Transition (Peak, ° C.) | DMTA PE β Transition (Peak, ° C.) |
|---|---|---|---|---|---|---|---|
| Example 2 | 0.43 | 99.50 | 31.00 | n/a | 165.00 | 8.00 | −54.00 |
| Example 3 | 0.55 | 99.00 | 16.00 | 119.00 | 165.00 | 7.00 | −54.00 |
| Example 4 | 0.65 | 98.00 | 10.00 | 119.00 | 165.00 | 9.00 | −53.00 |
| Example 5 | 0.75 | 96.00 | 13.00 | 119.00 | 165.00 | 8.00 | −50.00 |
| Example 6 | 0.82 | 80.00 | 47.00 | 119.00 | 165.00 | 7.00 | −45.00 |
| Inventive Example 9 | 0.90 | 11.00 | 93.00 | 119.00 | 165.00 | 10.00 | Absent |
| Comparative Example 18 | Example 18 | 12.00 | 92.00 | 99.00 | 165.00 | 10.00 | Absent |

TABLE 3

| Example | Type | Process | Catalyst | External Donor | C2/(C2 + C3) molar | MFR | wt. % C2 (Tot-IR) | Qualitative Optics | Haze (20 mil) | Haze (50 mil) |
|---|---|---|---|---|---|---|---|---|---|---|
| 15 | Inventive | SPHERIPOL ™ Pilot Plant | ZN-111 | D | 0.90 | 1.6 | 24 | Clear | 12 | 30 |
| 16 | Inventive | SPHERIPOL ™ Commercial Plant | ZN-118 | D | 0.90 | 2 | 18 | Clear | 10 | 26 |

TABLE 4

| Example | Type | Material | Description | Dispersed Phase Content (%) | MFR (dg/min) | Flexural Modulus (1% secant, psi) | Notched Izod (23° C., ft-lbs/in) | Notched Izod Break Type | Rockwell Hardness (R Scale) | DTU L at 66 psi (° C.) | 60° Gloss (%) | Haze, 50 mil disk (%) | 4° C. Gardner Impact (in-lbs) |
|---|---|---|---|---|---|---|---|---|---|---|---|---|---|
| 16 | Inventive | Inventive Example 16 | In-Reactor ICP | 20 | 2.0 | 141,000 | 8 | Non-break | 82 | 70 | 87 | 26 | 207 |
| 17 | Comparative | D334 | Compounded Formulation | 20 | 2.0 | 138,000 | 11 | Non-break | 82 | 83 | 93 | 18 | 227 |
| 18 | Comparative | INSPIRE ™ 117 | Compounded Formulation | 20 | 2.0 | 218,000 | 10 | Non-break | 98 | 111 | 90 | 23 | 246 |
| 19 | Comparative | TI4020 | In-Reactor ICP | 20 | 2.0 | 180,000 | 10 | Non-break | 82 | n/a | 90 | 100 | 200 |
| 20 | Comparative | FT021N | Homopolymer | 0 | 2.0 | 230,000 | 0.6 | Complete Break | n/a | n/a | 90 | 25 | 10 |

As shown in FIG. 1, an inventive ZN-catalyzed PP can demonstrate a substantial reduction in haze when the molar gas ratio is in excess of 0.82.

Figure 2:
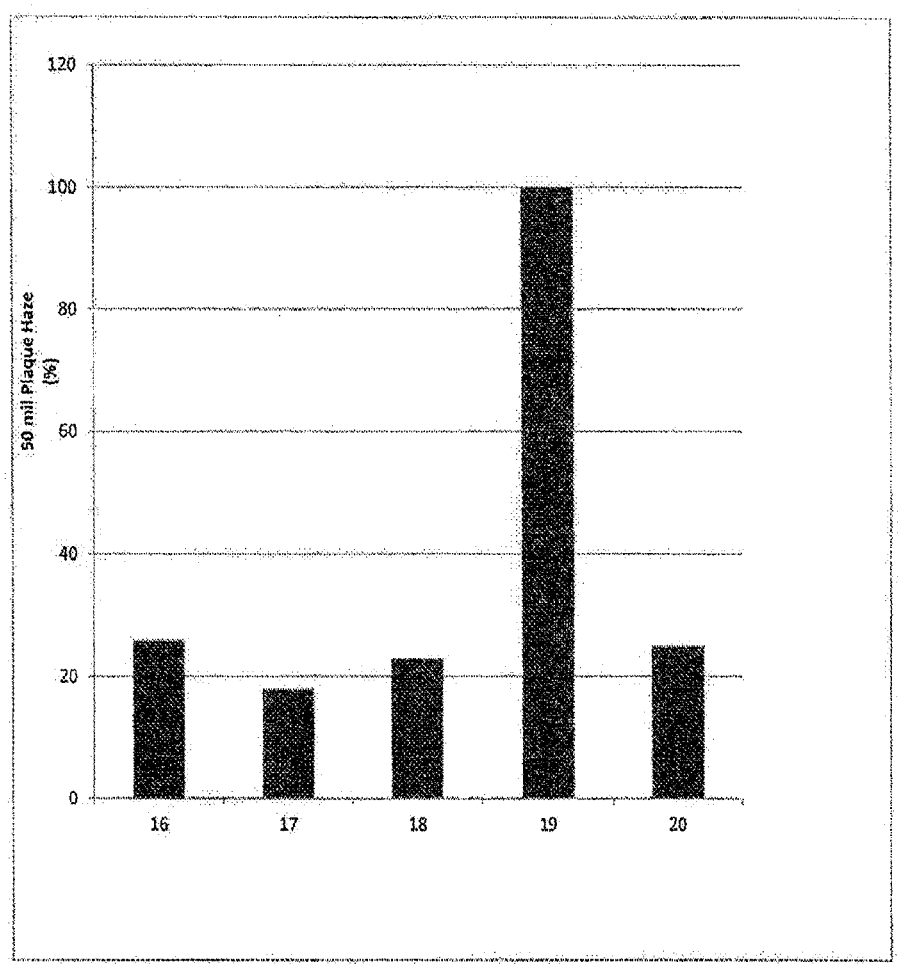
FIG. 2 depicts haze values of inventive and comparative examples.
Figure 3:
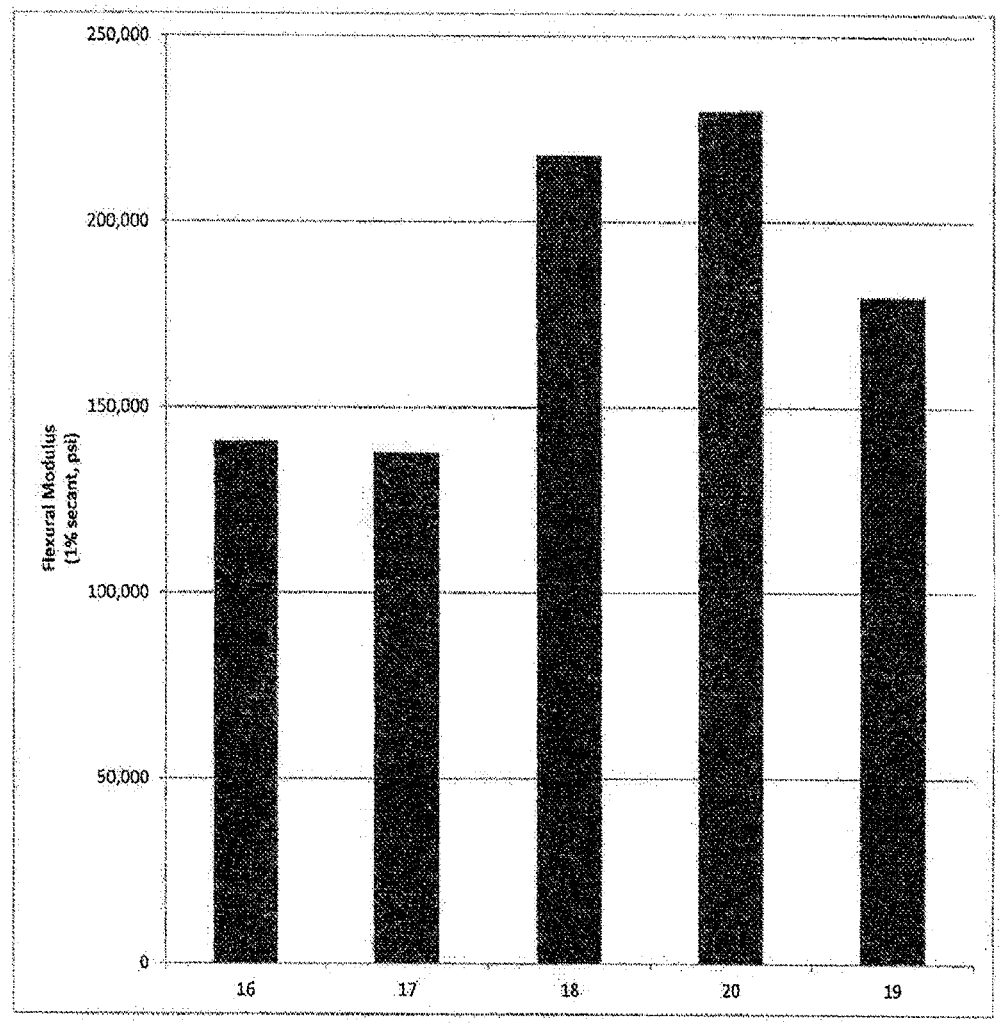
FIG. 3 depicts flexural modulus values of inventive and comparative examples.
Figure 4:
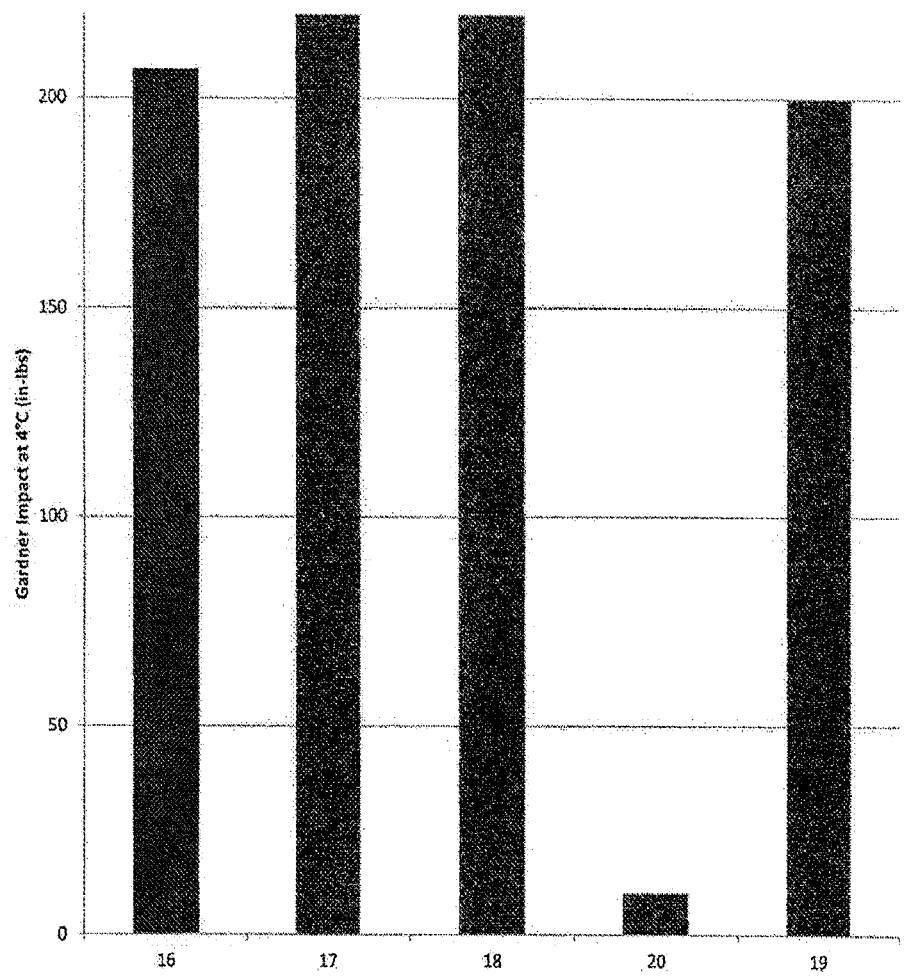
FIG. 4 depicts Gardner impact values of inventive and comparative examples.

As shown in FIGS. 2-4, the physical properties of the inventive compositions are comparable or superior to other compositions known in the art, without any additional compounding step or the addition of metallocene elastomers.

Figure 5:
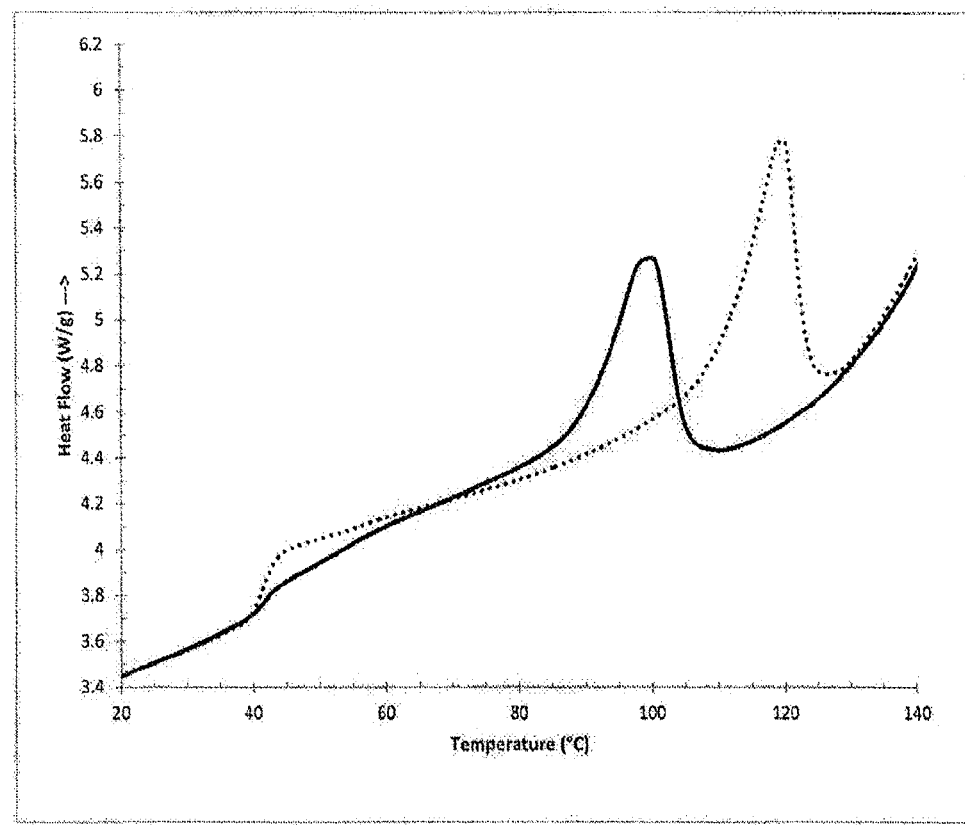
FIG. 5 depicts melt values of inventive and comparative examples.
Figure 6:
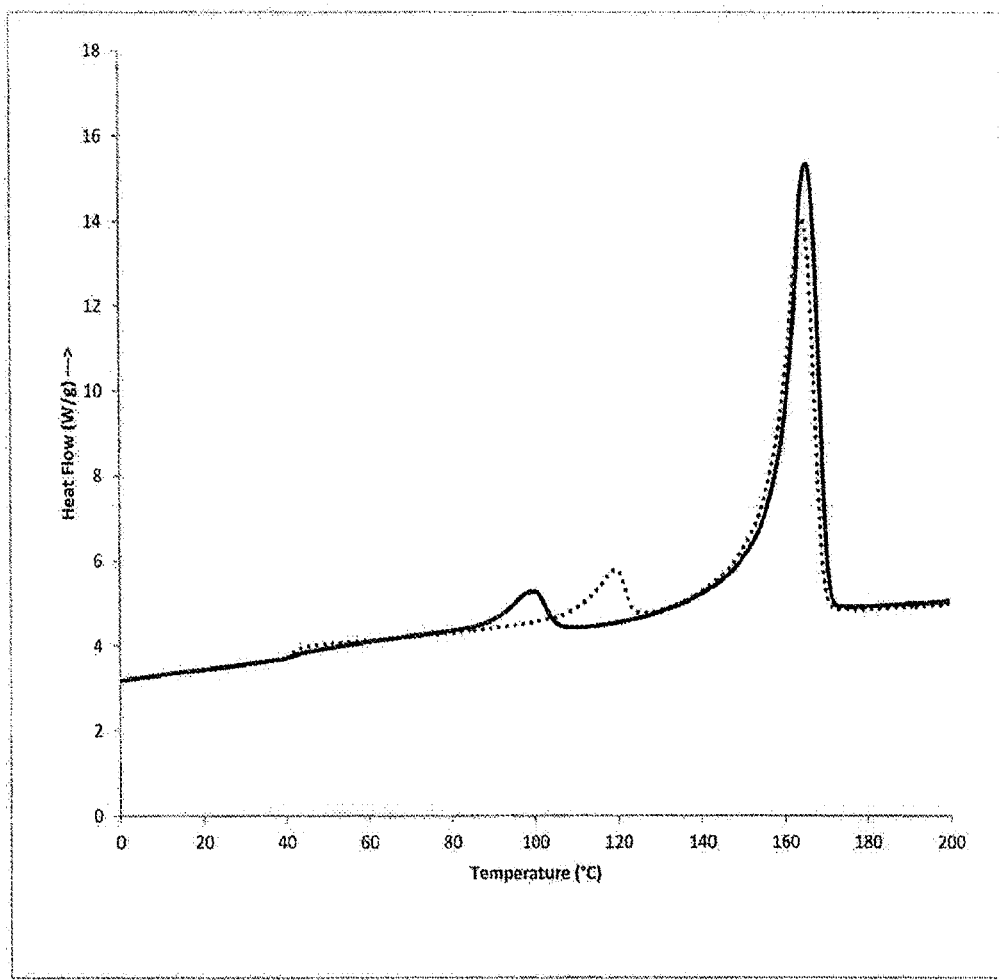
FIG. 6 depicts melt values of inventive and comparative examples.

As shown in FIGS. 5 and 6, one major physical property difference between the inventive sample and the compounded compositions (e.g., Comparative 18) is the first DSC melting point of the inventive samples is 119° C. whereas the compounded compositions have a first melting point of 99° C.

In an embodiment of the invention, it is hypothesized that this invention is clear despite the heterogeneity in the impact modifying component, because that component has an average refractive index of approximately 1.50, which is similar to that of polypropylene. Dispersed phases are able to allow light to pass through articles made from this material with only limited loss due to diffraction.

In an embodiment of the invention, the propylene impact copolymer may be made using one or more matrix phase polymerization steps, occurring in one or more gas phase reactors; one or more dispersed phase polymerization steps, occurring in one or more liquid phase reactors; and at least one de-gassing step.

Thus, the inventors have achieved an improved and commercially practicable method of producing a high C2 content in-reactor grade in liquid monomer slurry.

In contrast, U.S. Pat. No. 6,015,854 teaches that without gas phase technology, the preparation of the materials of its invention would not be practicable commercially, because of the large amounts of propylene monomer present in the bulk or liquid monomer slurry process; that monomer must be removed to achieve the desired high ethylene contents in the reaction product in the second reactor. With a diluent process, propylene would be dissolved in the diluent within the first reactor, and portions of the diluent would have to be removed to purge the system of much of the propylene prior to the introduction of the first stage polymer and catalyst species into the second reactor (see U.S. Pat. No. 6,015,854 at column 5, lines 38-48).

Using TA analytical software, a baseline was drawn on the second heating curve. The baseline extended from 20° C. to 170° C. Perpendicular lines (called "perpendicular drops" in the TA software) were placed at 110° C. and 130° C. and were used as integration limits. The integration limits were placed at 20° C., 130° C., 110° C., 115° C. and 170° C. Integrations were performed to obtain three distinct areas. Area 1 is defined as the area under the DSC curve (enthalpy of melting) between 110° C. and 130° C. Area 2 is defined as the area under the DSC curve (enthalpy of melting) between 115° C. and 130° C. Area 3 is the area between 120° C. and 130° C. Further results are shown in Table 5, below.

While the present invention has been described with respect to particular embodiments thereof, it is apparent that numerous other forms and modifications of the invention will be obvious to those skilled in the art. The appended claims and this invention generally should be construed to cover all such obvious forms and modifications, which are within the true spirit and scope of the present invention.

The invention claimed is:

1. A propylene impact copolymer comprising: (a) a matrix comprising a polypropylene homopolymer or a propylene/alpha-olefin random copolymer which comprises more than 50 wt. % of units derived from propylene monomer; and (b) a dispersed phase comprising an ethylene-propylene copolymer, wherein the dispersed phase has a melting point between 100° C. and 124° C., and an enthalpy greater than 11 J/g, the dispersed phase having a molar ratio of ethylene moiety/(ethylene moiety plus propylene moiety) greater than 0.82, wherein the propylene impact copolymer has a haze value less than 30% in a 50 mil plaque, and a haze value less than 15% in a 20 mil plaque.

2. The propylene impact copolymer of claim 1, having a Gardner impact value greater than 200 in-lbs.

3. The propylene impact copolymer of claim 1, catalyzed with a Ziegler-Natta catalyst.

4. The propylene impact copolymer of claim 1, having 10 wt. % or less xylene solubles.

5. A manufactured article comprising (a) a matrix comprising a polypropylene homopolymer or a propylene/alpha-olefin random copolymer which comprises more than 50 wt. % of units derived from propylene monomer; and (b) a dispersed phase comprising an ethylene-propylene copolymer, wherein the dispersed phase has a melting point between 100° C. and 124° C., and an enthalpy greater than 11 J/g, the dispersed phase having a molar ratio of ethylene moiety/(ethylene moiety plus propylene moiety) greater than 0.82, wherein the manufactured article has a haze value less than 30% in a 50 mil plaque, and a haze value less than 15% in a 20 mil plaque.

6. The manufactured article of claim 5, catalyzed with a Ziegler-Natta catalyst.

7. The manufactured article of claim 5 is a thermoformed container.

TABLE 5

| Matrix | Type | Xylene Solubles (%) | First Melting Peak | Second Melting Peak | Integration Limits: 110 to 130 | | | Integration Limits: 115 to 130 | | | Integration Limits: 120 to 130 | | | Total |
|---|---|---|---|---|---|---|---|---|---|---|---|---|---|---|
| | | | | | Area 1 (J/g) | Area 2 (J/g) | Area 3 (J/g) | Area X (J/g) | Area Y (J/g) | Area Z (J/g) | Area i (J/g) | Area j (J/g) | Area k (J/g) | Area (J/g) |
| Homopolymer Matrix (Matrix contains about 0% ethylene) | | | | | | | | | | | | | | |
| hpp matrix | Inventive | 2.0 | 122.0 | 165.0 | 14.6 | 13.4 | 81.9 | 17.7 | 11.3 | 83.1 | 21.9 | 7.1 | 83.1 | 112.0 |
| hpp matrix | Inventive | 2.0 | 122.0 | 165.0 | 18.8 | 17.6 | 79.1 | 22.6 | 14.6 | 80.1 | 27.5 | 9.7 | 80.1 | 117.4 |
| hpp matrix | Comparative Low Blush | 10.5 | 120.0 | 165.0 | 11.5 | 11.2 | 74.4 | 15.3 | 10.0 | 76.8 | 18.9 | 6.4 | 76.8 | 102.1 |
| hpp matrix | Comparative Standard Impact | 13.0 | 118.0 | 165.0 | 5.1 | 5.5 | 76.1 | 7.1 | 4.6 | 77.1 | 8.8 | 2.9 | 77.1 | 88.8 |
| Random Copolymer Matrix (Matrix contains about 2% ethylene) | | | | | | | | | | | | | | |
| RCP matrix | Inventive | 6.9 | 125.0 | 152.0 | 19.5 | 23.3 | 56.3 | 24.2 | 20.5 | 56.6 | 29.0 | 15.8 | 56.6 | 101.4 |
| RCP matrix | Comparative Metallocene Blend | 3.7 | 98.4 | 152.0 | 22.6 | 14.7 | 55.0 | 25.2 | 12.7 | 55.7 | 28.4 | 9.6 | 55.7 | 93.7 |

8. The manufactured article of claim 5 is a blow molded container.

9. The manufactured article of claim 5 is an injection molded container.

10. A process to produce a propylene impact copolymer comprising the steps of: (a) one or more matrix phase polymerization steps, occurring in one or more liquid phase reactors; (b) one or more dispersed phase polymerization steps, occurring in one or more gas phase reactors; and (c) at least one de-gassing step, the propylene impact copolymer comprising: (1) a matrix comprising a polypropylene homopolymer or a propylene/alpha-olefin random copolymer which comprises more than 50 wt.% of units derived from propylene monomer; and (2) a dispersed phase comprising an ethylene-propylene copolymer, wherein the dispersed phase has a melting point between 100 ° C. and 124 ° C., and an enthalpy greater than 11 J/g, the dispersed phase having a molar ratio of ethylene moiety/(ethylene moiety plus propylene moiety) greater than 0.82, wherein the propylene impact copolymer has a haze value less than 30% in a 50 mil plaque, and a haze value less than 15% in a 20 mil plaque.

11. The propylene impact copolymer produced by the process of claim 10, having a Gardner impact value greater than 200 in-lbs.

12. The propylene impact copolymer produced by the process of claim 10, catalyzed with a Ziegler-Natta catalyst.

\* \* \* \* \*